United States Patent
Vaswani et al.

(10) Patent No.: US 11,328,054 B2
(45) Date of Patent: May 10, 2022

(54) PREVENTING ACCESS TO SINGLE SIGN ON CREDENTIALS ASSOCIATED WITH EXECUTING APPLICATIONS

(71) Applicant: NETIQ CORPORATION, Houston, TX (US)

(72) Inventors: Gulshan Govind Vaswani, Bangalore (IN); Rahul Srinivas, Bangalore (IN); Srivathsa Rao, Bangalore (IN)

(73) Assignee: NETIQ CORPORATION, Houston, TX (US)

( * ) Notice: Subject to any disclaimer, the term of this patent is extended or adjusted under 35 U.S.C. 154(b) by 198 days.

(21) Appl. No.: 16/573,759

(22) Filed: Sep. 17, 2019

(65) Prior Publication Data
US 2020/0201986 A1 Jun. 25, 2020

(30) Foreign Application Priority Data
Dec. 21, 2018 (IN) .............................. 201841048724

(51) Int. Cl.
*G06F 12/14* (2006.01)
*G06F 12/12* (2016.01)
(Continued)

(52) U.S. Cl.
CPC .......... *G06F 21/53* (2013.01); *G06F 12/1458* (2013.01); *G06F 21/126* (2013.01); *G06F 21/41* (2013.01)

(58) Field of Classification Search
CPC ............. G06F 12/1441; G06F 12/1458; G06F 12/1483; G06F 21/126; G06F 21/41;
(Continued)

(56) References Cited

U.S. PATENT DOCUMENTS 6,279,111 B1 * 8/2001 Jensenworth ......... G06F 21/335
713/159
6,308,274 B1 * 10/2001 Swift .................... G06F 21/604
710/200
(Continued)

FOREIGN PATENT DOCUMENTS

WO WO2017121992 A1 7/2017

OTHER PUBLICATIONS

Couch, Adam. "Protecting the LSASS.EXE process with RunAsPPL", <https://www.adamcouch.co.uk/protecting-the-lsass-exe-process-with-runasppl/>. Dec. 1, 2017. (Year: 2017).*
(Continued)

*Primary Examiner* — Michael Simitoski

(57) ABSTRACT

A technique includes creating, by a computer, a sandboxed user account on the computer, where creating the sandboxed user account includes generating credentials for the sandboxed user account. The technique includes creating, by the computer, an operating system session and executing a single sign on (SSO) tool in the operating system session in association with the sandboxed user account. In response to a request that is associated with another user account to start up an application, authorizing, by the computer, use of the application by the other user account based on credentials that are associated with the other user account and starting up the application by the computer. Starting up the application includes using the SSO tool to inject SSO credentials for the other user account based on policy authorization into the application such that the application is executed in association with the sandboxed user account.

19 Claims, 7 Drawing Sheets

(51) Int. Cl.
*G06F 21/41* (2013.01)
*G06F 21/53* (2013.01)
*G06F 21/12* (2013.01)

(58) Field of Classification Search
CPC ............. G06F 21/53; G06F 2212/1052; G06F 2212/154; G06F 2212/163
See application file for complete search history.

(56) References Cited

U.S. PATENT DOCUMENTS

| | | | |
|---|---|---|---|
| 7,246,374 B1* | 7/2007 | Simon | G06F 9/543 |
| | | | 713/167 |
| 7,797,727 B1* | 9/2010 | Miller | G06F 21/53 |
| | | | 726/1 |
| 8,572,709 B2 | 10/2013 | Hockings et al. | |
| 8,863,298 B2 | 10/2014 | Akella et al. | |
| 9,712,514 B2 | 7/2017 | Breiman et al. | |
| 9,917,823 B2 | 3/2018 | Chin et al. | |
| 10,298,577 B1* | 5/2019 | Aithal | H04L 63/126 |
| 2002/0099952 A1* | 7/2002 | Lambert | G06F 21/53 |
| | | | 726/27 |
| 2007/0050369 A1* | 3/2007 | Stiegler | G06F 21/53 |
| 2007/0199072 A1* | 8/2007 | Plummer | G06F 9/468 |
| | | | 726/26 |
| 2008/0301816 A1* | 12/2008 | Ting | H04L 63/0815 |
| | | | 726/26 |
| 2012/0204245 A1* | 8/2012 | Ting | H04L 9/3228 |
| | | | 726/6 |
| 2015/0089645 A1* | 3/2015 | Vandergeest | G06F 21/54 |
| | | | 726/23 |
| 2016/0070630 A1* | 3/2016 | Williams | G06F 11/3648 |
| | | | 714/33 |
| 2016/0105422 A1* | 4/2016 | Burch | H04L 63/0823 |
| | | | 726/6 |
| 2016/0219060 A1* | 7/2016 | Karunakaran | H04L 63/102 |
| 2017/0228182 A1* | 8/2017 | Novak | G06F 3/067 |
| 2018/0013549 A1* | 1/2018 | Block | H04L 9/0894 |
| 2018/0343239 A1* | 11/2018 | Vaswani | H04W 12/068 |

OTHER PUBLICATIONS

F. Al Ameiri and K. Salah, "Evaluation of popular application sandboxing," 2011 International Conference for Internet Technology and Secured Transactions, 2011, pp. 358-362. (Year: 2011).*
Shilimar, Sunil Namdeo. Publication IN 685/MUM/2012 A, Published Dec. 27, 2013. (Year: 2013).*
Oracle; Configuring Oracle Privileged Account Manager for Integrated Solutions; Section 7.1-7.2; Date Unknown; 6 pages.
IBM ; Single Sign-On Privileged ID Audit Report; IBM Security Privileged Identity Manager 2.0.1; https://www.ibm.com/support/knowledgecenter/SSRQBP_2.0.1/com.ibm.ispim.doc_2.0.1/admin/cpt/c_cognos_priv_id_audit_report.html; Aug. 29, 2018; 3 pages.
Unknown; Protecting Privileged Accounts & Securing Single Sign-On; Data Breach Investigations Report, 11th Edition; Apr. 10, 2018; 5 pages.

* cited by examiner

US 11,328,054 B2

PREVENTING ACCESS TO SINGLE SIGN ON CREDENTIALS ASSOCIATED WITH EXECUTING APPLICATIONS

BACKGROUND

An enterprise may use privileged Single Sign On (SSO) technology to control user access to various enterprise applications. In general, with SSO technology, a given set of SSO credentials may be shared by multiple end users of the enterprise, and this given set of SSO credentials allows the end users to access multiple applications. In general, SSO credentials may be stored in an SSO credentials vault, and when a given end user starts, or launches, an application to which the end user is entitled to access, an SSO tool executing on the user's computer retrieves the SSO credentials from the SSO credentials vault and injects the SSO credentials into the application.

DETAILED DESCRIPTION

Figure 1:
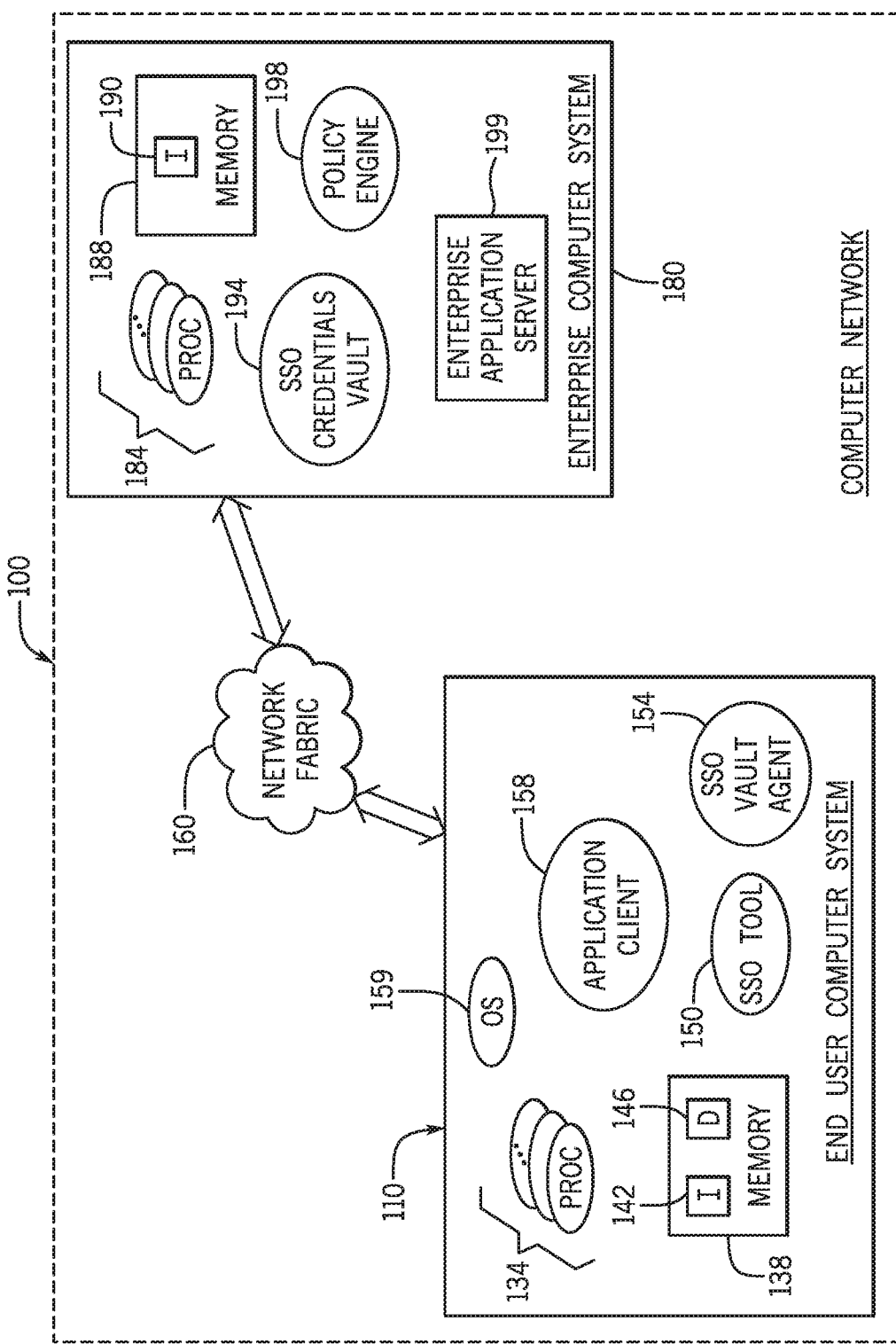
FIG. 1 is a schematic diagram of a computer network according to an example implementation.

Single sign on (SSO) technology may be used to perform a privileged single sign on to various enterprise applications in an end user's session. For example, an end user may, through the user's computer, directly access the enterprise applications that execute on enterprise computers. For purposes of managing access to such applications, the enterprise may use SSO technology to inject privileged SSO credentials into the enterprise applications for its end users.

In general, the same set of SSO credentials may be shared by multiple end users that have the same or similar roles in the enterprise. Due to the sharing of the SSO credentials, SSO technology is premised on the end user being unaware of the SSO credentials that are injected into a given application, and it is important that these SSO credentials remain hidden from the end user. Otherwise, if the SSO credentials are revealed to end users, then the tracking capability of the SSO credentials are lost; and as such, a rogue end user may potentially misuse and perform malicious operations on a target enterprise application.

One potential way in which an end user may gain access to SSO credentials is for the end user to log in to the user's computer using the user's privileged login credentials (a name and a password, for example) to begin a session associated with the user's privileged account; start up an enterprise application under the user's privileged account (which causes SSO credentials to be injected into the application); and then access the virtual memory space of the application to reveal the injected SSO credentials. For example, the user may access a debugging program or perform a memory dump of the application, and either of these techniques may, in turn, reveal the contents of the virtual memory space, including the SSO credentials. One approach to avoid such security risks of revealing the shared privileged credentials is to install enterprise applications on a secured, remote dedicated server. End users are given limited remote access to the enterprise application GUI and not to the entire remote operating system session. Therefore, end users cannot debug the enterprise applications. However, this approach is not as convenient for the end user, as the enterprise applications are not installed on the end user's machine, and the end user not have direct access to the enterprise applications.

In accordance with example implementations that are described herein, measures are employed to prevent an end user from accessing SSO credentials that have been injected into a given application on behalf of the end user. More specifically, in accordance with example implementations, an SSO tool executes on an end users computer system for purposes of injecting SSO credentials for the end user; and an agent of an SSO credentials vault executes on the end user's computer system for purposes of providing the SSO credentials to the SSO tool. In accordance with example implementations, an agent is running as a service or daemon on the computer under a privileged user account, such as an "admin" or "system" account. The agent creates a non-privileged sandboxed user account so that the SSO tool and any SSO-related applications that are launched, or started, by the user are run under the sandboxed user account, i.e., both the SSO tool and the enterprise application where SSO is to be performed are executed under a sandboxed user account in the end user's session.

As described further herein, the sandboxed user account is a restricted non-administrator account. To launch a particular application for which SSO credentials are to be injected, the end user may select a particular option of the agent, such as a "run as" option. When this occurs, the agent communicates details about the user and the application with the SSO credentials vault. If the end user is authorized to access the application, the SSO credentials vault communicates SSO credentials of that application, which this end user is allowed to access, to the agent; the agent communicates the SSO credentials to the SSO tool; and the SSO tool injects the SSO credentials into the application.

In accordance with example implementations, injecting SSO credentials into an application refers to injecting credentials (a login name and a password, for example) into the field(s) of a login prompt of a graphical user interface (GUI) that is provided by the application. Because the SSO tool and the enterprise application are running, or executing, under the sandboxed user account and the agent is running under the admin or built-in SYSTEM account, the end user does not have rights to certain functions, as enforced by the operating system, which may reveal contents of the virtual memory space of the application (and thus, may reveal the SSO credentials). In particular, in accordance with example implementations, the end user does not have rights to use a memory dump or debugging processes. Therefore, due to the restricted access provided by this sandboxed user account, measures are put in place to restrict access of the end user to the injected SSO credentials.

In accordance with further example implementations, access to SSO credentials may be inhibited by the use of system hooks, which, as further described herein, invoke kernel driver operations to prevent end user actions to reveal application memory contents. This technique may be used in conjunction with the above-described sandboxed user account. In this manner, even with the sandboxed user account a clever rogue end user may use features of the first application, such as a file explorer option or an open file option to launch an operating system utility, such as a task manager or a third party debugging utility. Now the task manager (or third party debugging utility) runs under the sandboxed user account, the end user may access the virtual memory space of the application through the utility (by performing a memory dump or accessing a debugging application using the utility).

To prevent this from occurring, in accordance with example implementations, system hooks are registered by a kernel driver. When a prohibited action, such as an action to perform a memory dump or debugging, is attempted, a system hook is invoked and correspondingly triggers execution of the kernel driver. When executed, the kernel driver takes corresponding actions to prevent the contents of the applications' virtual memory from being revealed. These actions may include, for example, an action to deny access to an application memory dump, deny access to a debugging program, terminate the application, terminate the threads of the application, rescind user access rights (revoke user credentials, for example), suspend the application, suspend the threads of the application, and so forth. The kernel driver controls access to the agent processes, SSO tool process, enterprise application in which the SSO is performed and any child/grandchild/great grandchild (and so on) processes that are created by them.

As a more specific example, FIG. 1 depicts a schematic diagram of a computer network 100 in accordance with example implementations. In general, the computer network 100 includes an end user computer system 110. In general, the end user computer system 110 may be, as examples, a laptop, a tablet computer, a smartphone, a desktop computer, a wearable computer, and so forth, depending on the particular implementation. Regardless of the particular form of the end computer system 110, an end user may use the end user computer system 110 to remotely access an enterprise computer system 180 via network fabric 160.

In particular, the end user may use the computer system 110 to access an enterprise application client 158. As an example, the enterprise application client 158 may connect to an application server 199 that runs on a server of the enterprise computer system 180. In general, the enterprise computer system 180 may employ SSO technology for purposes of injecting SSO credentials for the end user into the enterprise application client 158 when the end user has access rights for the application client 158. In accordance with example implementations, the SSO technology involves injecting SSO credentials into a login prompt fields in a GUI provided by the enterprise application client 158.

More specifically, in accordance with some implementations, as depicted in FIG. 1, the computer network 100 may include the following SSO technology-related components: a credentials vault 194 (located on the enterprise computer system 180); an SSO tool 150 (located on the end user computer system 110); and an agent 154 for the credentials vault 194 (herein called the "vault agent 154" and located on the end user computer system 110). The credentials vault 194 stores privileged SSO credentials for one or multiple end user groups (groups sharing the same or similar roles in an enterprise, for example) and policies for the authorization of end users and their affiliations with the SSO credentials. These policies may be controlled, for example, by a policy engine 198 of the enterprise computer system 180.

The SSO tool 150 executes on the end user computer system 110. In general, the SSO tool 150 is constructed to detect SSO credentials received from the SSO credentials vault 194 for a particular application, such as enterprise application client 158, to which an end user is entitled to access and inject the SSO credentials into the login GUI for the application client 158.

The vault agent 154 is a trusted component of the credentials vault 194. During installation of the vault agent 154 on the end user computer system 110, the vault agent 154 registers with the credentials vault 194 using deployment administrator login credentials. In general, the communications from the vault agent 154 are secured and are trusted by the credentials vault 194. In accordance with example implementations, the vault agent 154 may run on the end user computer system 110 as a service under a privileged account, such as a SYSTEM user account in the Windows® operating system.

In accordance with example implementations, the vault agent 154 starts up and authenticates the SSO tool 150; authorizes SSO credentials for the enterprise application client 158 (in response to an end user starting, or launching, the enterprise application client 158) based on the login credentials that are provided by the end user; and after the vault agent 154 determines that the end user is authorized to launch the enterprise application client 158, the vault agent 154 may communicate with the credentials vault 194 to retrieve the SSO credentials to be injected into the application 158 on behalf of the end user. In this manner, the vault agent 154 communicates SSO credentials received from the credentials vault 194 to the SSO tool 150, and the SSO tool 150 may then inject the SSO credentials into the enterprise application client 158.

In accordance with example implementations, the end user computer system 110 is an actual, physical machine that includes one or multiple actual, physical machines that include actual hardware and actual machine executable instructions (or "software"). It is noted that, in accordance with example implementations, the end user computer system 110, including actual, physical machines, may create one or multiple virtual machines; and the components of the end computer system 110 that are described herein (such as the application client 158, SSO tool 150, SSO vault agent 154, and so forth) may execute on one or multiple virtual machines. In accordance with example implementations, the end user computer system 110 may include one or multiple physical hardware processors 134, such as one or multiple central processing units (CPUs), one or multiple CPU cores, and so forth. End user computer can also be a virtual desktop or virtual machine assigned to end user. Moreover, the end user computer system 110 may include a local memory 138. In general, the local memory 138 is a non-transitory memory that may be formed from, as examples, semiconductor storage devices, phase change storage devices, magnetic storage devices, memristor-based devices, a combination of storage devices associated with multiple storage technologies, and so forth.

Regardless of its particular form, the memory 138 may store various data 146 (e.g., data representing variables and parameters used by the SSO tool 150, the vault agent 154, the enterprise application client 158, and so forth). The memory 138 may store machine executable instructions and/or application data 142 (or "software"), which are executed by the processor(s) 134. In general, the machine executable instructions 142, when executed by one or multiple processors 134, cause the processor(s) 134 to form one or multiple components of the end user computer system 110, such as, for example, the SSO tool 150, the vault agent 154, the enterprise application client 158, an operating system 159, and so forth.

In accordance with further example implementations, one or multiple components of the end user computer system 110 may be formed from hardware that does not execute machine executable instructions, such as, for example, an Application Specific Integrated Circuit (ASIC) or a field programmable gate array (FPGA).

In accordance with example implementations, the enterprise computer system 180 may include one or multiple physical or virtual machines (one or multiple personal computers, work stations, servers, rack-mounted computers, special purpose computers, as examples), where the machine(s) include one or multiple hardware processors 184 and memory 188 storing data and storing machine executable instructions 190. The instructions 190, when executed by the processor(s) may cause the processor(s) 184 to form one or multiple components of the enterprise computer system 180, such as, for example, the SSO credentials vault 194, the applications 199, the policy engine 198, and so forth. The memory 188 may be, for example, a non-transitory memory that may be formed from one or multiple devices, such as those listed above for the local memory 138.

In general, the enterprise computer system 180 may include a network of multiple computers that may be located at a single physical location or may be geographically distributed. Moreover, the enterprise computer system 180 may, in accordance with example implementations, be a public cloud-based system, a private cloud-based system, a hybrid-based system (i.e., a system that has public and private cloud components), a private system disposed on site, a private system geographically distributed over multiple locations, and so forth. Moreover, the end user computer system 110 may communicate with the enterprise computer system using the network fabric 160.

Thus, although the enterprise computer system 180 is depicted as being contained within a "box," in FIG. 1, it is understood that the enterprise computer system 180 may be a distributed system in which the components that are depicted in FIG. 1 (the SSO credential vault 194, the policy engine 198, the enterprise application server 199, and so forth) may be located on different machines and/or may be disposed at different geographical locations for the enterprise computer system 180. In other words, depending on the particular implementation, the SSO credentials vault 194, the policy engine 198, and the enterprise application server 199 may not be co-located on the same machine or even located on machines at a common geographical location.

In general, the network fabric 160 may include components and use protocols that are associated with any type of communication network, such as (as examples) Fibre Channel networks, iSCSI networks, ATA over Ethernet (AoE) networks, HyperSCSI networks, local area networks (LANs), wide area networks (WANs), global networks (e.g., the Internet), or any combination thereof.

Figure 2:
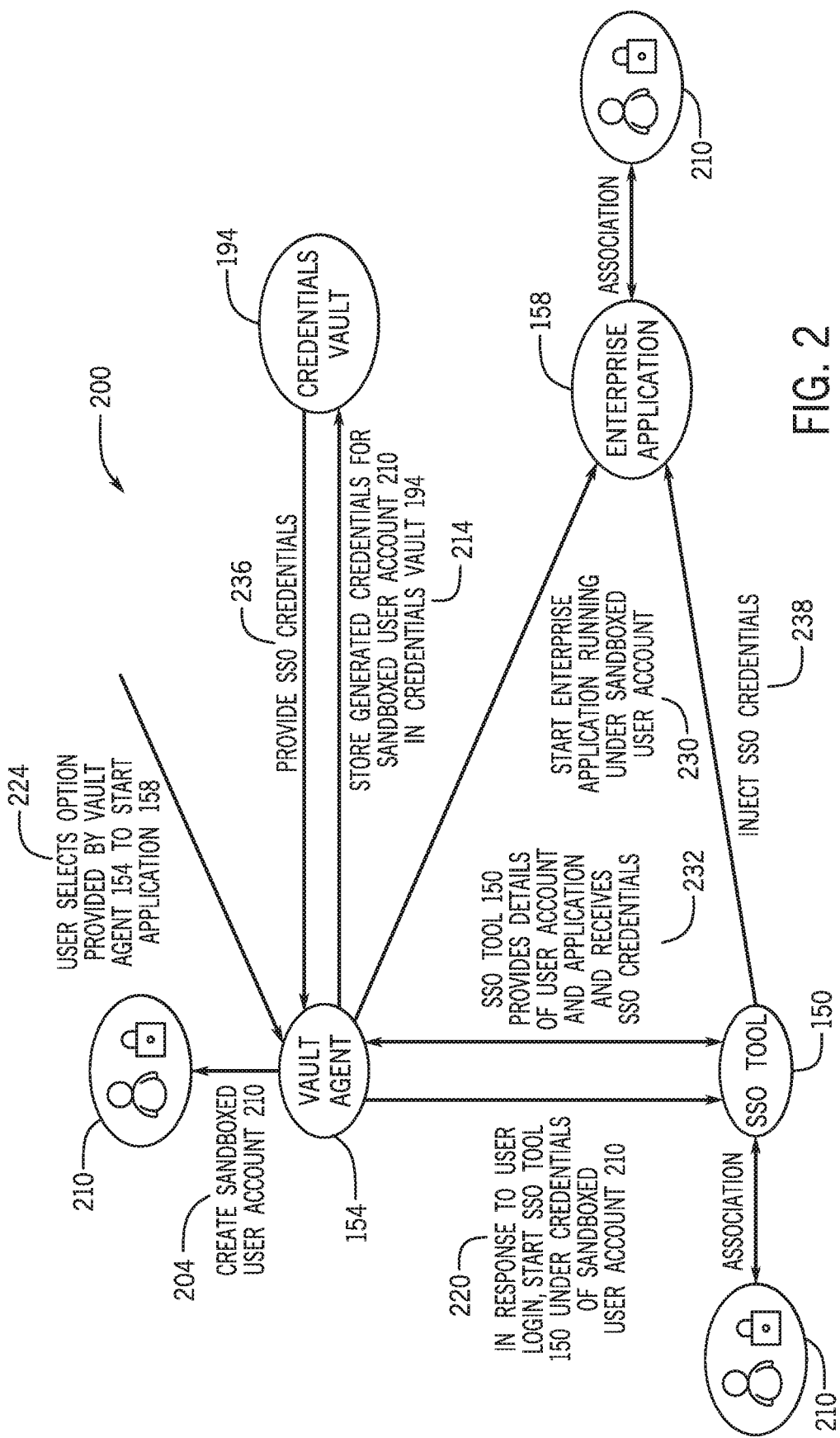
FIG. 2 is an illustration of a flow used to create and use a sandboxed user account to prevent end user access to SSO credentials according to an example implementation.

Referring to FIG. 2 in conjunction with FIG. 1, in accordance with example implementations, a sandboxed user account is used to inhibit end user access to the virtual memory space of the enterprise application client 158 to inhibit, if not prevent, access to the SSO credentials that are injected into the enterprise application client 158. More specifically, as illustrated in example flow 200 of FIG. 2, a sandboxed user account 210 may be created (as depicted at reference numeral 204) by the vault agent 154. For example, in accordance with some implementations, the vault agent 154 may create the sandboxed user account during installation of the vault agent 154 on the end user computer system 110.

In accordance with example implementations, the credentials (credentials such as a password and a user name, for example) of the sandboxed user account 210 is unknown, as the vault agent 154 randomly or pseudorandomly generates the credentials. As depicted at reference numeral 214, in accordance with some implementations, the vault agent 154 may communicate with the credentials vault 194 to securely store the credentials for the user account 210 in the credentials vault 194. Moreover, in accordance with example implementations, the vault agent 194 may locally store a cached copy of the credentials.

An end user may log in to the end user computer system 110 using login credentials (herein called the "user login credentials") that are associated with a particular privileged user account. In general, the vault agent 154 allows, or gives, access to the end user for enterprise applications for which the user is authorized, pursuant to the policies established by the enterprise. For the example implementations that are described herein, the end user is authorized to use the enterprise application client 158. When the end user logs in to the user account, in accordance with example implementations, the operating system 159 creates an operating system session, which is the session for the end user. In this session, the SSO tool 150 and the enterprise application client 158 are started under the sandboxed user account, i.e., execute under the sandboxed user account.

More specifically, in accordance with example implementations, as depicted at reference numeral 220, in response to the login of the user (via the user login credentials), the vault agent 154 starts the SSO tool 150 under the credentials of the sandboxed user account 210. Accordingly, the SSO tool 150 runs, or executes, under the sandboxed user account 210, instead of running under, for example, the end user's account.

In accordance with example implementations, the end user may start, or launch, the enterprise application client 158 as follows. As depicted at reference numeral 224, in accordance with some implementations, the user selects an option provided by the vault agent 154, to start, or launch, the enterprise application client 158, and when this occurs, the vault agent 154 may start (as depicted at reference numeral 230) the enterprise application client 158 running under the sandboxed user account 210. In accordance with some implementations, this option to start the application 158 may be similar to a "run as" option. Here, because the user starts up the application 158 using the option that is provided by the vault agent 154, the user cannot start the application 158 under different credentials. Thus, the user does not start up the enterprise application client 158 under the privileged user account, as the application is launched by the vault agent 154 in association with the sandboxed user account, and the vault agent 154 knows the credentials of the sandboxed user account.

In accordance with example implementations, as depicted at reference numeral 232, the SSO tool 150 detects the password prompt (via a graphical user interface (GUI) of the enterprise application client 158, for example) of the enterprise application client 158 and requests the vault agent 154 to provide the SSO credentials. Moreover, the SSO tool 150 authenticates itself with the vault agent 154. The SSO tool 150 provides details of the enterprise application client 158 and the details regarding the user requesting starting of the enterprise application client 158. The vault agent 154 authorizes the startup of the enterprise application client 158 based on the details that are provided by the SSO tool 150 and provides the SSO credentials to the SSO tool 150. The SSO tool 150 injects (as depicted at reference numeral 238) the SSO credentials into the enterprise application client 158 (i.e., the SSO tool 150 provides the SSO credentials to the GUI-based login prompt provided by the client 158), and therefore, logs into the application client 158.

Therefore, at this point, both the enterprise application client 158 and the SSO tool 150 are executing in association with the sandboxed user account 210. Moreover, the sandboxed user account 210, in accordance with example implementations, is a non-administrator to the end user computer system 110; and as such, access rights associated with the sandboxed user account 210 are restricted to execute any privileged tasks on the end user computer system 110.

Thus, at this point, if the end user attempts to debug or dump the memory of the SSO tool 150, the enterprise application client 158, or the vault agent 154, the end user would be denied such attempt by the operating system 159, as these actions are not permitted by the operating system 159. In this manner, these respective processes are running under different accounts (the sandboxed user account 210 and the SYSTEM account), as compared to the end user account, which is a non-administrator account. In this manner, both the SSO tool 150 and the enterprise application client 158 are running under the end user's session but, with the sandboxed user account 210, are not associated with the end user's account. Similarly, the vault agent 154 is running under the SYSTEM account and is not associated with the end user's account.

Figure 3:
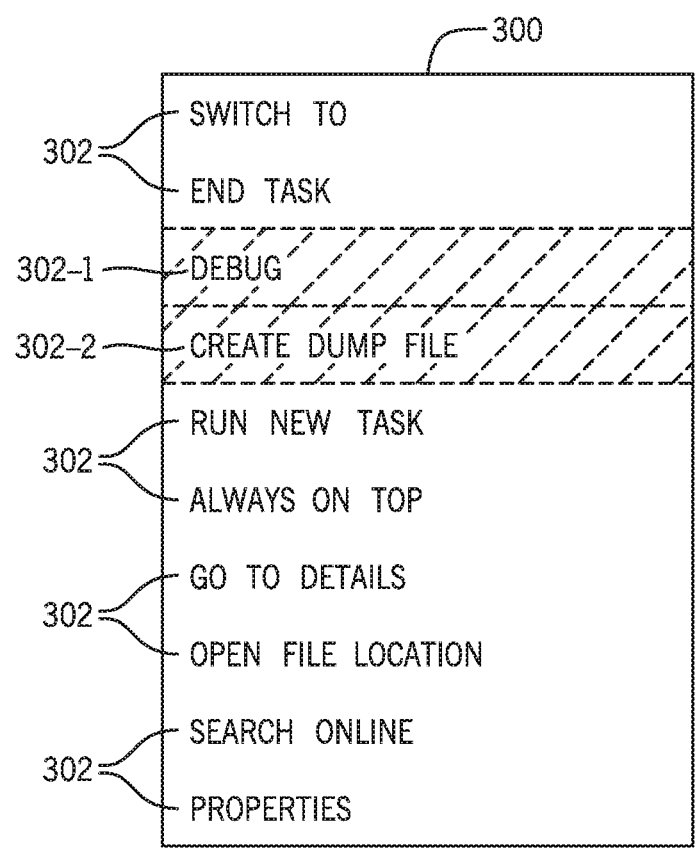
FIG. 3 is an illustration of an option provided by a debugging tool according to an example implementation.

Thus, if the end user were to, for example, open the Task Manager in Windows® and right click with the mouse on a menu option displaying the identifier for the enterprise application client 158, the user may be presented with a menu 300 of options 302, as depicted in FIG. 3. The menu 300 may include an option 302-1 to debug the enterprise application client 158 and an option 302-2 to create a memory dump file for the enterprise application client 158. However, due to the enterprise application client 158 being associated with the sandboxed user account 210 (FIG. 2), these options 302-1 and 302-2 would be access denied on execution by the operating system 159, i.e., these options are not available to the end user, thereby preventing access through these mechanisms to the virtual memory space of the enterprise application client 158. Moreover, if the end user attempted a similar debugging or memory dump for the SSO tool 150 or vault agent 154, the operating system 159 (FIG. 1) would likewise prevent these attempts as well.

Although FIG. 3 depicts options provided by an operating system-based debugging tool, the debugging tool may be a tool other than an operating system-provided tool in accordance with further example implementations.

A rogue end user may possibly circumvent the above-described measures imposed by the sandboxed user account 210 by using a file open or file explorer menu option of the enterprise application client 158. In this manner, using such a file open or file explorer menu option, a rogue user may open a utility, such as a file explorer; and then, through the file explorer utility, the end user may launch the task manager. The task manager would run under the sandboxed user account 210 and therefore be able to dump the memory, which gets downloaded to the sandboxed users account profile path and can be analyzed by the end user. Thus, with this approach, the user may launch any other custom application to debug the original launched enterprise application client 158. To prevent this from occurring, in accordance with example implementations, a flow 400 of operations may be performed, as depicted in FIG. 4.

Figure 4:
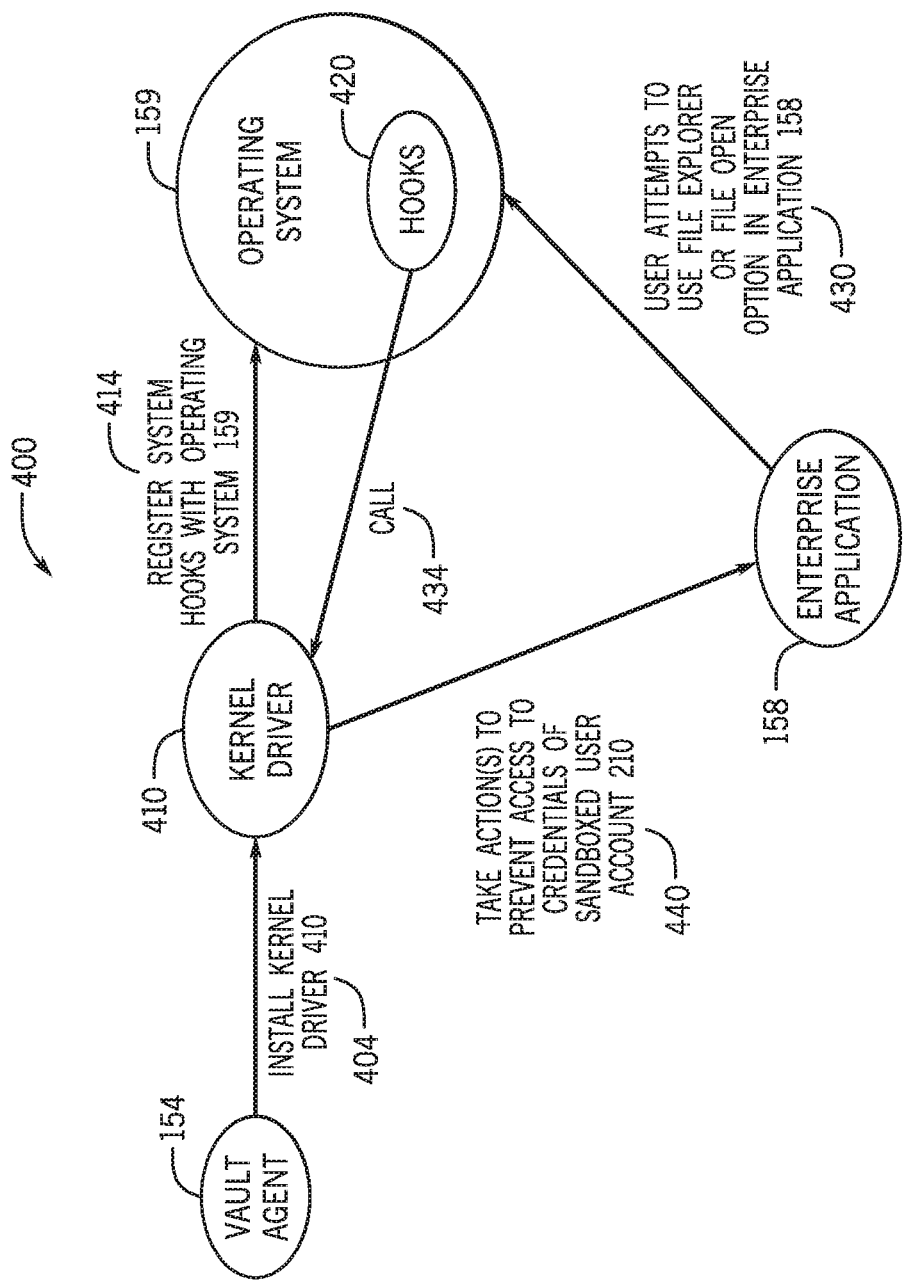
FIG. 4 is an illustration of a flow to prevent end user access to SSO credentials using system hooks according to an example implementation.

Referring to FIG. 4 in conjunction with FIG. 1, in accordance with example implementations, the vault agent 154 may install (at reference numeral 404) a kernel driver 410, and in general, the kernel driver 410 may have input/output control (I/O CTL) communications with the vault agent 154. The kernel driver 410 may register 414 system hooks 420 with the operating system 159, such as the following hooks: OB_OPERATION_REGISTRATION and OB_OPERATION_HANDLE_CREATE.

Due to the registering of the hooks 420, whenever a registered process handle is created, the kernel driver 410 is called (as depicted at reference numeral 434), and when called, the kernel driver 410 takes one or more actions (as depicted at reference numeral 440) to prevent access to the SSO credentials. In accordance with some implementations, these actions may include, as examples, an action to deny access to the virtual memory space of the enterprise application client 158; an action to deny access to terminate, or end, execution of the enterprise application client 158 or its threads; an action to deny access to suspend execution of the enterprise application client 158 or its threads; an action to resend access rights of the end user; and so forth. In accordance with example implementations, the above-noted access rights are not only denied for the main process but may also be denied for any child or further child processes created by the child processes. Thus, the kernel driver 410 removes an option for the end user to debug any of the processes related to the SSO tool 150, enterprise application client 158 or vault agent 154.

Thus, the above-described system hooks 420 prevent the memory space of the SSO tool 150 and enterprise application client 158 from being accessed, and these processes and their child processes may not be debugged or memory dumped.

Depending on the particular implementation, the above-described system hooks may be used with or without the above-described sandboxed user account. In this manner, in accordance with a first example implementation, the vault agent 154 (FIG. 1) may create the sandboxed user account and use the above-described system hooks and kernel driver to prevent access to the SSO credentials; and in accordance with a second example implementation, the vault agent 154 may not use the sandboxed user account and may, instead, rely solely on the system hooks and kernel driver to prevent access to the SSO credentials. Thus, many variations are contemplated, which are within the scope of the appended claims. Thus, the above described system allows enterprise applications to be installed on end user's machine and still perform privileged SSO to them in a secured way. This simplifies end user accessibility to enterprise applications.

Figure 5:
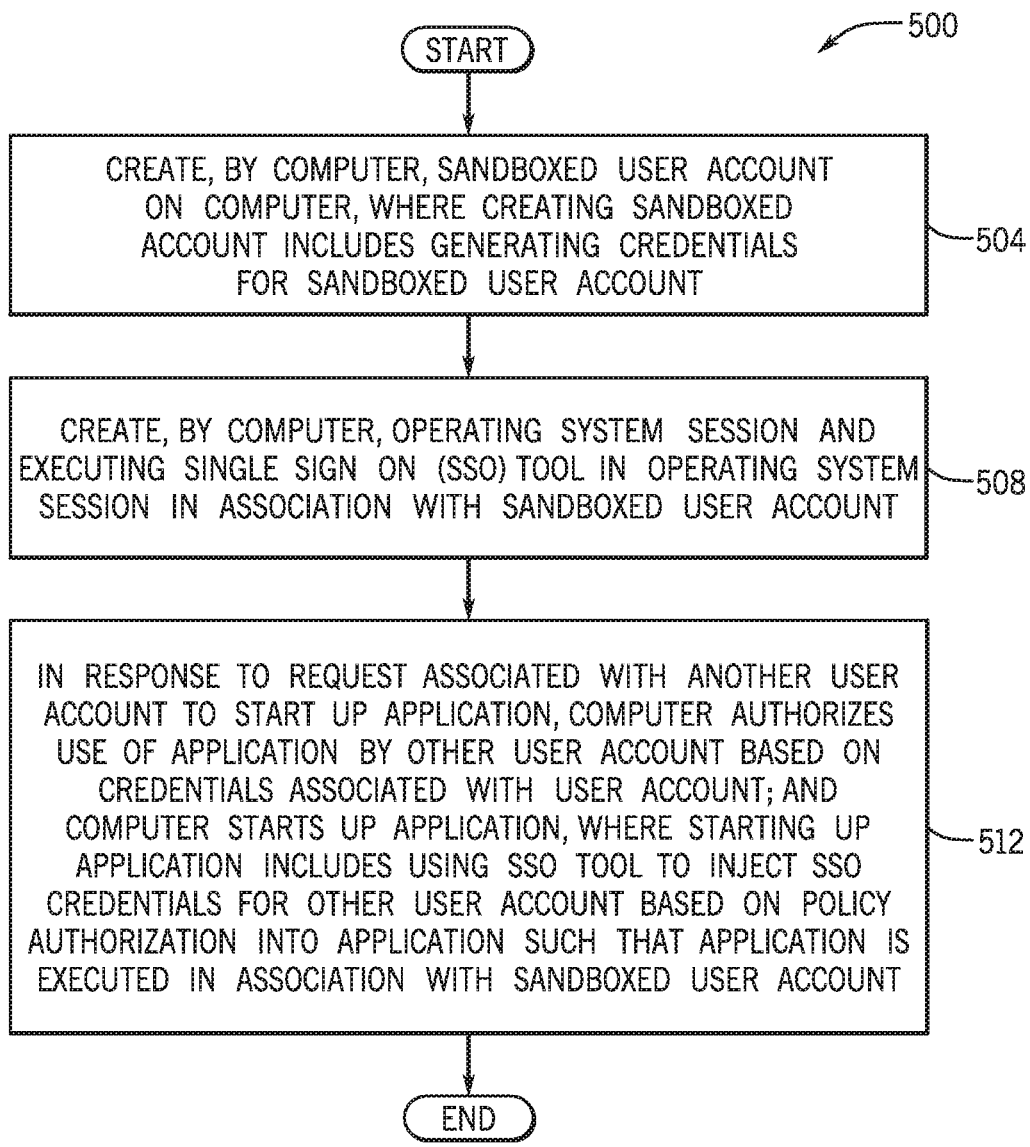
FIG. 5 is a flow diagram depicting a technique to create and use an SSO user account in association with an application in which SSO credentials are injected into the application according to an example implementation.

Referring to FIG. 5, in accordance with example implementations, a technique 500 includes creating (block 504), by a computer, a sandboxed user account on the computer, where creating the sandboxed user account includes generating credentials for the sandboxed user account. The technique 500 includes, pursuant to block 508, creating, by the computer, an operating system session and executing a single sign on (SSO) tool in the operating system session in association with the sandboxed user account. Pursuant to block 512, in response to a request that is associated with another user account to start up an application, authorizing, by the computer, use of the application by the other user account based on credentials that are associated with the other user account and starting up the application by the computer. Starting up the application includes using the SSO tool to inject SSO credentials for the other user account based on policy authorization into the application such that the application is executed in association with the sandboxed user account.

Figure 6:
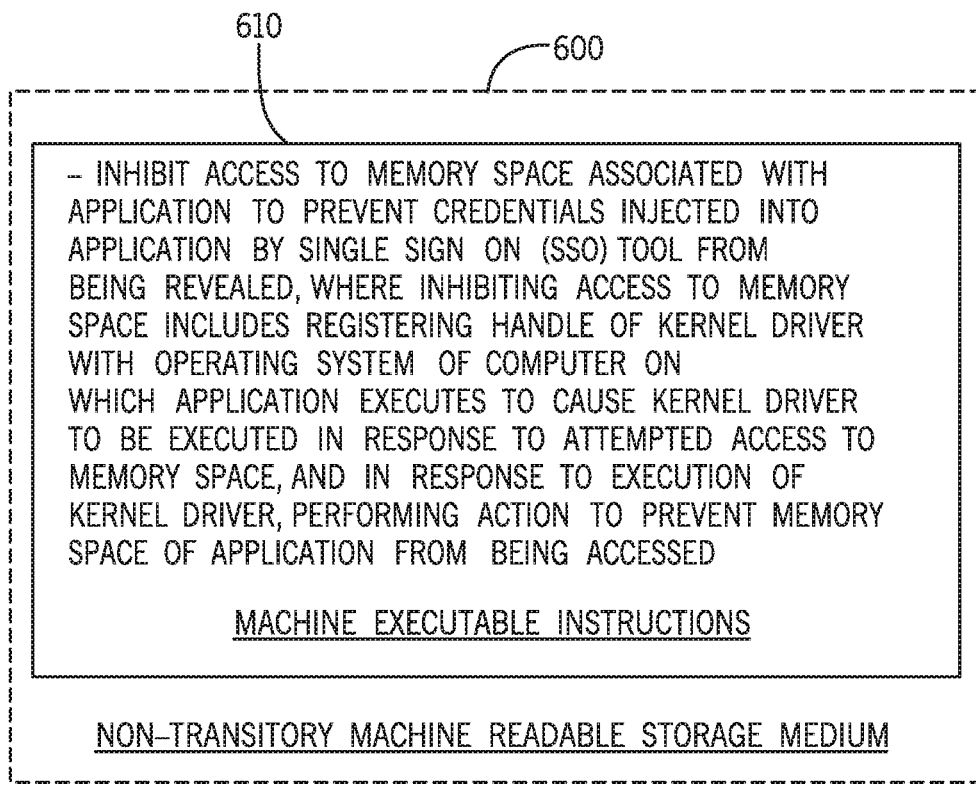
FIG. 6 is an illustration of a non-transitory machine readable storage medium that stores machine executable instructions that are executed by a machine to cause the machine to inhibit access to a memory space associated with an application using a kernel driver according to an example implementation.

Referring to FIG. 6, in accordance with example implementations, a non-transitory machine readable storage medium 600 stores machine executable instructions 610 that, when executed by a machine, cause the machine to inhibit access to a memory space that is associated with an application to prevent credentials that are injected into the application by a single sign on (SSO) tool from being revealed. Inhibiting access to the memory space includes registering a handle of a kernel driver with an operating system of a computer on which the application executes to cause the kernel driver to be executed in response to an attempted access to the memory space; and in response to the execution of the kernel driver, performing an action to prevent the memory space of the application from being accessed.

Figure 7:
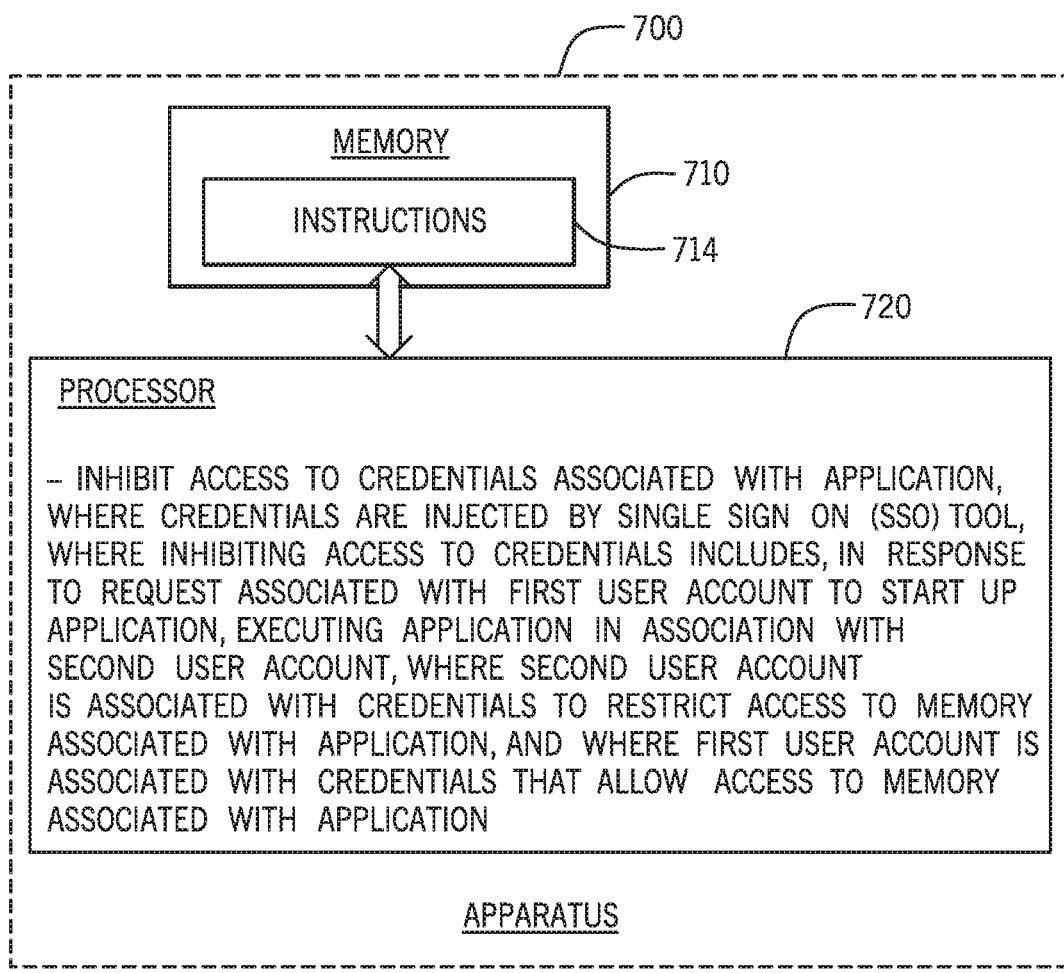
FIG. 7 is a schematic diagram of an apparatus to inhibit access to credentials associated with an application and injected by an SSO tool according to an example implementation.

Referring to FIG. 7, in accordance with example implementations, an apparatus 700 includes a processor 720 and a memory 710. The memory 710 stores instructions 714 that, when executed by the processor 720, cause the processor 720 to inhibit access to credentials that are associated with an application. The credentials are injected by a single sign on (SSO) tool. Inhibiting access to the credentials includes, in response to a request associated with the first user account to startup the application, executing the application in association with a second user account. The second user account is associated with credentials to restrict access to memory associated with the application, and the first user account is associated with credentials that allow access to the memory associated with the application.

As noted above, in accordance with example implementations, the vault agent 154 may pseudorandomly or randomly generate credentials for the sandboxed user account. For example, the vault agent 154 may randomly or pseudorandomly generate characters, a number or a string representing a password for the sandboxed user account. In this context, a "pseudorandomly" generated value refers to a value that is nearly randomly generated, such as, for example, through the use of seed-based generator, which provides a pseudorandom value at its output. As examples, a seed value for the seed-based generator may be derived from a state or condition at the time the pseudorandom value is to be generated, such as input provided by real time clock (RTC) value, a counter value, a measured noise value, a register value, and so forth. The seed-based generator may be a polynomial-based generator, which receives a seed value as an input, applies a polynomial function to the seed value and provides an output (digital data, for example) that represents a pseudorandom value.

In accordance with further example implementations, the vault agent 154 may include a true random number generator, which provides values that individually or collectively represent a truly random password for the sandboxed user account. For example, the random number generator may include an analog-to-digital converter (ADC) that provides a random digital output; and the ADC may sample a truly random analog signal, such as a thermal noise signal (a Johnson-Nyquist noise signal that is provided by a resistor, for example) or an atmospheric noise signal that is received by an antenna.

While the present disclosure has been described with respect to a limited number of implementations, those skilled in the art, having the benefit of this disclosure, will appreciate numerous modifications and variations therefrom. It is intended that the appended claims cover all such modifications and variations

What is claimed is:

1. A method comprising:
creating, by a computer, a sandboxed user account on the computer, wherein creating the sandboxed user account comprises generating single-sign-on (SSO) credentials for the sandboxed user account;
storing the SSO credentials for the sandboxed user account in a credentials vault;
creating, by the computer, an operating system session and executing a SSO tool in the operating system session in association with the sandboxed user account; and
in response to a request from an end user account to start up a first application, the computer:
determining that the end user account is authorized to use the first application based on user credentials associated with the end user account; and
starting up the first application for the end user account under the sandboxed user account, wherein starting up the first application comprises using the SSO tool to communicate with an agent of the credentials vault to request the SSO credentials for the sandboxed user account, receive the SSO credentials from the agent, and inject the SSO credentials into the first application to cause the first application to be executed under the sandboxed user account,
the SSO tool communicating with the credentials vault, via the agent, to store the user credentials for the end user account in the credentials vault.

2. The method of claim 1, wherein the sandboxed user account is a non-administrator user account.

3. The method of claim 1, wherein the sandboxed user account has inhibited access to a memory space of the first application.

4. The method of claim 1, wherein the sandboxed user account is prohibited from accessing a memory dump option for the first application.

5. The method of claim 1, wherein the sandboxed user account is prohibited from debugging the first application.

6. The method of claim 1, wherein the SSO tool and the first application are running under the sandboxed user account, and the operating system session prevents the end user account from debugging the first application under the sandboxed user account.

7. The method of claim 1, wherein creating the sandboxed user account occurs in response to installation of an SSO agent on the computer.

8. The method of claim 1, wherein using the SSO tool to inject the SSO credentials comprises using the SSO tool to provide the SSO credentials to a graphical user interface (GUI)-based log in prompt provided by the first application.

9. The method of claim 1, wherein the agent is associated with the computer, and the credentials vault is associated with a remote computer.

10. The method of claim 1, wherein the first application allows starting of a second application associated with the end user account, the method further comprising:

providing a system hook to detect start-up of the second application while the first application is being executed; and perform an action to prevent the second application from accessing a memory space associated with the first application.

11. The method of claim 10, wherein providing the system hook comprises registering a kernel driver with an operating system of the computer to cause the kernel driver to be executed in response to an attempted start-up of the second application, and the execution of the kernel driver performs the action to prevent the second application from accessing the memory space of the first application.

12. The method of claim 10, wherein the second application is executable to perform a memory dump of the first application or to debug the first application.

13. The method of claim 10, further comprising performing one or more of the following in response to the start-up of the second application:

terminating the first application or a thread associated with the first application, terminating an access right of the end user account to the first application, or suspending the first application or Hail the thread associated with the first application.

14. A non-transitory computer-readable storage medium that stores instructions that, when executed by a machine, cause the machine to:

create a sandboxed user account, including generating single-sign-on (SSO) credentials for the sandboxed user account;

store the SSO credentials for the sandboxed user account in a credentials vault;

execute a SSO tool in an operating system session in association with the sandboxed user account; and in response to a request from an end user account to start up a first application, determine that the end user account is authorized to use the first application based on user credentials associated with the end user account;

start up the first application under the sandboxed user account, wherein to start up the first application, the instructions cause the machine to: use the SSO tool to communicate with an agent of the credentials vault to request the SSO credentials for the sandboxed user account, receive the SSO credentials from the agent, and inject the SSO credentials into the first application to cause the first application to be executed under the sandboxed user account; and use the SSO tool to communicate with the credentials vault, via the agent, to store the user credentials for the end user account in the credentials vault.

15. The non-transitory computer-readable storage medium of claim 14, wherein the instructions, when executed by the machine, cause the machine to use a kernel driver of the machine to prevent the end user account from accessing a memory dump of the first application or debugging the first application.

16. The non-transitory computer-readable storage medium of claim 15, wherein the instructions, when executed by the machine, cause the machine to use the kernel driver to perform at least one of terminating the first application or a thread associated with the first application, terminating an access right of the end user account to the first application, or suspending the first application or the thread associated with the first application.

17. An apparatus comprising:

a processor; and a memory storing instructions that, when executed by the processor, cause the processor to:

create a sandboxed user account, including generating (SSO) credentials for the sandboxed user account;

store the SSO credentials for the sandboxed user account in a credentials vault;

execute a SSO tool in an operating system session in association with the sandboxed user account; and in response to a request from an end user account to start up a first application, determine that the end user account is authorized to use the first application based on user credentials associated with the end user account, start up the first application under the sandboxed user account, wherein to start up the first application, the instructions cause the processor to: use the SSO tool to communicate with an agent of the credentials vault to request the SSO credentials for the sandboxed user account, receive the SSO credentials from the agent, and inject the SSO credentials into the first application to cause the first application to be executed under the sandboxed user account, and use the SSO tool to communicate with the credentials vault, via the agent, to store the user credentials for the end user account in the credentials vault.

18. The apparatus of claim 17, wherein the sandboxed user account is prohibited from accessing a memory dump option for the first application or debugging of the first application.

19. The apparatus of claim 17, wherein the processor and the memory are part of a computer, and the first application is installed on the computer.

* * * * *